United States Patent [19]

Contri

[11] 4,326,153
[45] Apr. 20, 1982

[54] FEEDBACK MOTOR CONTROL CIRCUIT

[75] Inventor: Robert F. Contri, Villa Park, Ill.

[73] Assignee: Sunbeam Corporation, Chicago, Ill.

[21] Appl. No.: 167,627

[22] Filed: Jul. 11, 1980

[51] Int. Cl.³ .............................................. H02D 5/16
[52] U.S. Cl. ................................. 318/327; 318/345 D
[58] Field of Search ............ 318/345 D, 345 H, 327, 318/328, 326, 341, 618, 317; 307/252 UA; 324/164

[56] References Cited

U.S. PATENT DOCUMENTS

| | | | |
|---|---|---|---|
| 2,876,406 | 3/1959 | Charbonneaux et al. | 318/227 |
| 2,999,295 | 9/1961 | Manning et al. | 26/54 |
| 3,249,839 | 5/1966 | Fay | 318/327 |
| 3,402,338 | 9/1968 | Thoresen | 318/310 |
| 3,403,315 | 9/1968 | Maynard | 318/227 |
| 3,470,436 | 9/1969 | Steele | 318/227 |
| 3,506,852 | 4/1970 | De Hart | 307/252 UA |
| 3,514,686 | 5/1970 | Shano | 318/327 |
| 3,525,916 | 8/1970 | Chodash | 318/345 |
| 3,549,972 | 12/1970 | Callan | 318/327 |
| 3,569,809 | 3/1971 | Comer | 318/338 |
| 3,596,158 | 7/1971 | Watrous | 318/345 D |
| 3,596,162 | 7/1971 | Takayama | 318/341 |
| 3,604,996 | 9/1971 | Lutz | 318/331 |
| 3,701,935 | 10/1972 | Collie | 318/325 |
| 3,705,990 | 12/1972 | Pileckis | 307/252 UA |
| 3,812,409 | 5/1974 | Dinger | 318/317 |
| 3,895,278 | 7/1975 | Picunko | 318/421 |
| 3,916,278 | 10/1975 | Currell et al. | 318/313 |
| 4,093,899 | 6/1978 | Denny | 318/227 |
| 4,149,116 | 4/1979 | Minakuchi | 318/341 |
| 4,163,181 | 7/1979 | Farber | 318/245 |
| 4,176,307 | 11/1979 | Parker | 318/798 |
| 4,227,128 | 10/1980 | Cockroft et al. | 318/325 |

OTHER PUBLICATIONS

"Simple Resistor Network Eliminates DC Tachometer" Electronic Design 12-19-68, p. 100.
Ernst et al. "Current Zero-Crossing Detection For Thyristor Control" IBM Tech. Disclosure Bull., vol. 15, No. 3, Aug. 72, p. 734.
Van Cleave et al. "Complete Half-Wave Thyrister Control" IBM Tech. Disclosure Bull., vol. 16, No. 9, Feb. 1974, p. 2962.
LM2907, LM2917 Frequency to Voltage Converter Description and Application, National Semiconductor 1979 Linear Data Book, pp. 9-80 through 9-92, inclusive.

Primary Examiner—David Smith, Jr.
Attorney, Agent, or Firm—George R. Clark; Neil M. Rose; Robert J. Fox

[57] ABSTRACT

A magnetic tachometer sensor for a motor control circuit having a motor driven interrupter wheel in proximity thereto supplies a motor speed signal to a frequency to voltage converter. The frequency to voltage converter produces a DC signal proportional to the speed of the interrupter wheel. The DC signal is compared to a user selected reference voltage in an error amplifier, thereby producing an error signal. The error signal is supplied to an output comparator which also receives a sawtooth timing reference signal in synchronism with power supply alternating current. The output comparator switches to trigger a triac into conduction when the sawtooth signal voltage exceeds the error voltage, thereby providing highly accurate timing of the switching point of the triac. The triac is arranged to provide a phase angle speed control for an electric motor used in a household appliance.

8 Claims, 2 Drawing Figures

FEEDBACK MOTOR CONTROL CIRCUIT

BACKGROUND OF THE INVENTION

The use of thyristors or triacs as speed controls for electric motors is well-known in the art. Assignee of the instant application is also assignee of U.S. Application Ser. No. 915,977, filed June 16, 1978, by Cockroft et al. While the combination of a mechanical governor and triac providing phase angle speed control has been adequate to supply the needs of most home appliance users for motor speed accuracy, applicant has found that a higher degree of motor speed accuracy is demanded by the purchaser of a relatively expensive appliance, such as that disclosed in U.S. Pat. No. 4,176,971, which is assigned to the assignee of the instant application.

One of the problems encountered with the mechanical governor-thyristor speed control is mistriggering of the thyristor. Since the rotational speed of a universal series induction electric motor is a function of the amount of power supplied to rotate a selected load, the average power supplied to a motor can be controlled by switching a triac connected in series with the motor into conduction at a preselected phase angle, as is well-known in the prior art. Some problems, however, have been encountered when small amounts of power are to be supplied to the motor. This necessitates triggering the triac a relatively short time before the next AC zero crossing or at a relatively small conduction angle. At times, it has been found that triggering at very small conduction angles can cause the triac to conduct for larger conductions angles of the next several half cycles than would be required to maintain speed. This is because the response time to motor speed changes is relatively long due to the inertia of the mechanical components of the governor in the prior art systems such as the one disclosed in Application Ser. No. 915,977, previously mentioned. The unwanted additional power thereby supplied has a tendency to make the motor race or vary in speed when the motor should be rotating at the preselected slower speed.

In addition, it is desirable to provide feedback to the triac or motor controller through nonmoving or electronic elements which will not wear.

What is needed is a closed loop motor speed control system having highly accurate and rapid response to motor speed changes.

SUMMARY OF THE INVENTION

The present invention is directed to a motor speed control circuit having a magnetic tachometer feedback system. The motor speed control circuit includes a rotor or interrupter wheel having a plurality of teeth and being drivingly connected to an electric motor to be controlled. A magnetic pick-up is positioned adjacent to the rotor in good magnetic flux linkage therewith so that the changing reluctance of the magnetic pick-up as the rotor revolves in its vicinity produces a quasisinusoidal electric signal for supply to a frequency to voltage converter. The frequency to voltage converter produces a DC voltage having an amplitude which is directly proportional to the speed of rotation of the magnetic rotor. This DC speed signal is supplied to a differential amplifier 96 having an open collector transistor as its output stage. A reference voltage, preselected by a user, is also supplied to the differential amplifier. The differential amplifier produces an error signal directly proportional to the difference between the DC speed signal and the user selected reference signal, which is fed to a pair of comparators.

A zero crossing detector receives alternating current from an external alternating current power source and blocks a relatively high voltage bias of a ramp generator at nearly all times, except when the AC potential periodically crosses zero. When zero crossing occurs, and for a brief interval before and after, the zero crossing detector acts as a sink; its output potential drops to zero or ground.

A resistor-capacitor combination having a relatively long time constant is connected to the output of the zero crossing detector. When the alternating current crosses zero, the capacitor is discharged through the zero crossing detector and does not begin recharging until the zero crossing detector switches to the blocking state. When the zero crossing detector switches to its blocking condition, the capacitor begins charging slowly to produce a substantially linear ramp voltage. The capacitor charges to approximately 4 volts and is rapidly discharged at the next zero crossing. Thus, the capacitor acts as a ramp generator and produces a sawtooth wave having a period equal to one-half the period of the AC power. The sawtooth wave is fed to the ganged comparators, which also receive the operational amplifier signal. When the sawtooth wave potential exceeds the amplitude of the error signal, the comparators switch to a blocking condition directing a trigger signal to a triac, which switches to a conducting state and passes current through the electric motor. It may be appreciated that since the capacitor charges very slowly with respect to its time constant, the voltage produced by the capacitor bears a substantially linear relationship to time since the capacitor is only charged to a relatively low voltage, as compared to the supply voltage. The charging function of the capacitor is linear rather than exponential. This provides very accurate timing of the comparator switching and allows the triac to be switched conducting to the desired phase angle with much more accuracy than previously.

It may be also appreciated that the use of tachometer feedback allows the circuit to control the electric power to provide highly accurate speed control under varying load conditions.

It is, therefore, a principal object of the present invention to provide a motor spaced control circuit having precisely timed switching to produce the desired conduction angle to obtain a selected speed.

It is another object of the instant invention to provide a motor control circuit having a magnetic tachometer feedback system, which contains no moving parts other than a rotor.

It is still another object of the present invention to provide a motor control circuit having good stability and accuracy over a wide range of speed and load conditions.

Other objects of the instant invention will become obvious to one skilled in the art as the specification and claims are perused.

DESCRIPTION OF THE PREFERRED EMBODIMENT

Figure 1:
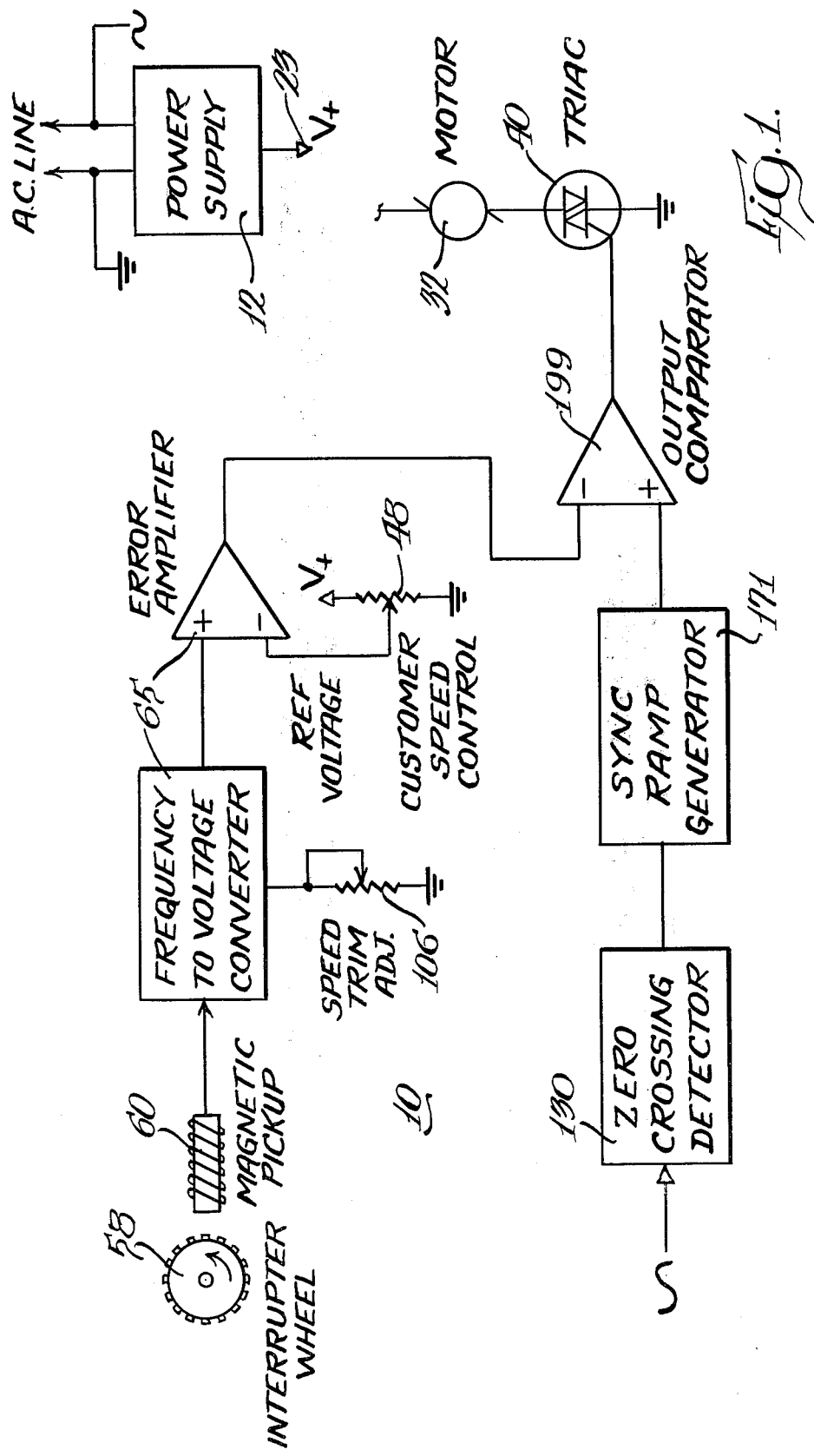
FIG. 1 is a block diagram of the motor speed control circuit embodying the instant invention.
Figure 2:
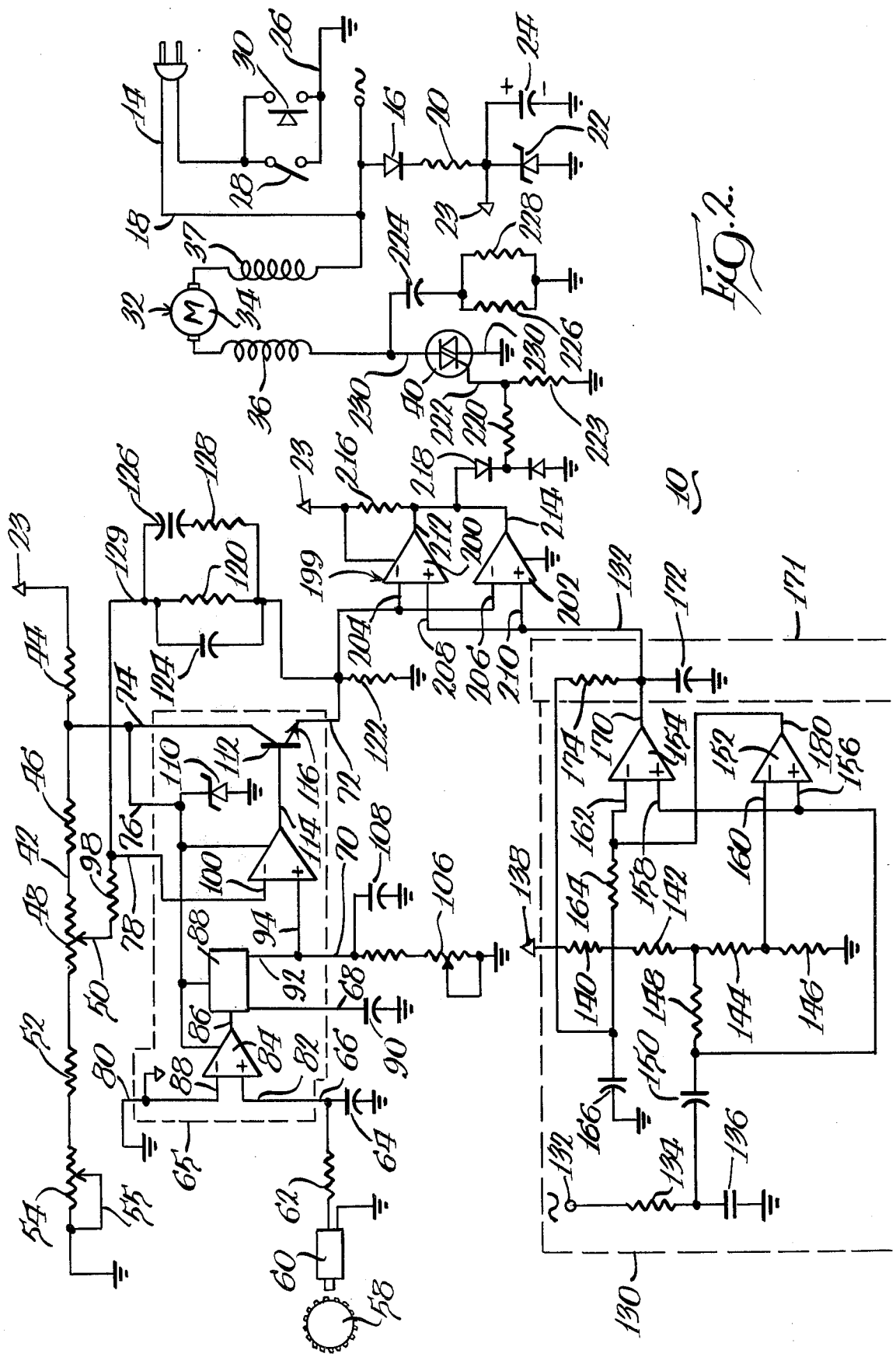
FIG. 2 is a detailed schematic diagram of the motor speed control circuit of FIG. 1.

Referring to the drawings, FIGS. 1 and 2, a feedback motor control circuit 10 is shown therein. Feedback motor control circuit 10 has a power supply 12 connected to receive alternating current at line voltage and frequency from a power cord 14. The alternating current is converted to a regulated DC potential by power supply 12. It is half-wave rectified by a diode 16 connected to a lead 18 of the power cord 14.

In order to reduce the half-wave rectified voltage to a level usable by other portions of the speed control circuit 10, a resistor 20 and a zener diode 22 are connected in series with diode 16. Filtering of the attenuated half-wave voltage is supplied by an electrolytic capacitor 24 connected to the junction of resistor 20 and zener diode 22. A return path is provided by the ground connection for zener diode 22 and capacitor 24 through a lead 26, which is one of the leads of power cord 14. The speed control circuit is switched off and on by either a single pole-single throw switch 28 connected in lead 26 or a spring biased momentary contact switch 30 connected in parallel with switch 28.

A motor 32 having an armature 34 and field coils 36 and 37 connected in series therewith is electrically connected to lead 18 to receive electric power therefrom. Motor 32 is a universal motor, which may be operated from either alternating current or direct current. In addition, the motor can be run in either of two directions, which are user selectable, as described in co-pending patent applications which were filed July 11, 1980 under U.S. Ser. Nos. 167,496 and 167,503 respectively, by William Scott and Robert W. Nickelson for APPARATUS COMPRISING A DRIVING UNIT, WHICH MAY BE COMBINED SELECTIVELY WITH FOOD-PROCESSING APPLIANCES, and William Scott and Mohammed K. Wagdy for FOOD MIXING APPARATUS COMPRISING A DRIVING UNIT AND A SEPARABLE ARM, filed contemporaneously with the instant application and assigned to the assignee of the instant application. The power flow through the motor 32 is controlled by a triac 40 connected in series therewith. Triac 40 is also connected through the grounded return back to lead 26. When either switch 28 or switch 30 is closed, power flow through the motor is controlled solely by a triac 40.

In order to control the switch of triac 40, a speed sensing means comprising a frequency to voltage converter and error amplifier is employed. A positive 22 volt potential is generated at the output lead 23 of the power supply 12 and is supplied to a resistor network 42 comprising a first fixed resistor 44 connected to output terminal 23 of the power supply 12. A second fixed resistor 46 is connected in series with fixed resistor 44. A potentiometer 48 is connected in series with fixed resistor 46. Potentiometer 48 includes a sweep arm 50. A fixed resistor 52 is connected in series with potentiometer 48. A variable resistor 54 is connected between fixed resistor 52 and ground. Variable resistor 54 has a sweep arm 55 also connected to ground. Adjustment of the sweep arm 55 alters the potential drop across resistors 44, 46, 48 and 52. Resistor 54 is factory adjusted for reasons which will become apparent later in the application.

In order to supply a feedback signal indicative of the rotational speed of the motor 32 to the motor control circuit 10, a 24-tooth interrupter wheel 58 of ferromagnetic material is drivingly connected to the armature 34 of the motor 32. A magnetic pick-up 60 is located in proximity to the teeth of the interrupter wheel 58 so that as the motor 32 rotates the interrupter wheel 58, the varying reluctance of the magnetic pick-up generates a quasi-sinusoidal signal in the magnetic pick-up windings, as is well-known in the art. A resistor 62 and capacitor 64 are series connected between the magnetic pick-up 60 and ground to filter high frequency unwanted transients to ground.

In order to convert the frequency of the magnetic pick-up signal to a voltage, which is linearly related to the interrupter wheel speed, applicant employs a frequency to voltage converter 65 comprising a well-known commercially available integrated circuit design for this purpose sold by the National Semiconductor Company. In this instance, the circuit is an LM2917N-8 and is packaged in a package having eight pins, respectively numbered 1 through 8 in the National Semiconductor scheme and for purposes of this application, respectively numbered 66, 68, 70, 72, 74, 76, 78 and 80. The sine wave signal is supplied to pin 66, which feeds a noninverting terminal 82 of an operational amplifier 84. Operational amplifier 84 has an inverting terminal connected to both internal ground and external ground through pin 80. Operational amplifier 84 is driven as a comparator and produces a square wave at its output terminal 86. The square wave has a frequency equal to the frequency of the magnetic pick-up signal. The square wave is supplied to a charge pump 88, which is connected through pin 68 to a grounded capacitor 90 and through a conductive pathway 92 to a noninverting terminal 94 of an operational amplifier 96. Operational amplifier 96 is also connected as a differential amplifier and has a resistor 98 connected through pin 78 to inverting terminal 100. Resistor 98 is connected to sweep arm 50 of the potentiometer 48. The noninverting input terminal of operational amplifier 96 is also connected to pin 70, which is series connected through a resistor 104 and a variable speed trim adjusting resistor 106 to ground. Current supplied by charge pump 88 produces a voltage across resistors 104 and 106 which is sensed by input terminal 94 of error amplifier 96. A filtering capacitor 108 is connected in parallel to resistors 104 and 106 to ground to remove a portion of the AC component from the quasisinusoidal signal provided by magnetic pick-up 60.

The charge pump 88 charges capacitor 90 from a regulated voltage supplied at pin 74 to a zener diode 110, which supplied DC voltage at input terminal 94, which is linearly proportional to the signal frequency generated by the magnetic pick-up 60.

A user can control the speed of the electric motor 32 by selecting a setting of sweep arm 50 in a conventional manner. The selected sweep arm position produces a regulated reference voltage, which is supplied to inverting terminal 100 of operational amplifier 96. The DC speed voltage at inverting terminal 94 is added to the inverse of the user selected reference voltage at pin 100 and an error output signal is supplied to a transistor 112 at its base 114. Transistor 112 has its emitter 116 connected to pin 72 for output of a voltage linearly proportional to the difference between the DC speed signal potential and the user selected reference potential.

The reference voltage picked up by sweep arm 50 is supplied through resistor 98, in this instance, a 47 kilohm resistor, to pin 100. A resistor 120 is connected in the feedback loop between pin 100 and emitter 116. Resistor 120 has a resistance of 10 megohms. A resistor 122 is connected between resistor 120 and ground. A capacitor 124 having a capacitance of 0.0015 microfarads is connected in parallel with resistor 120. A series RC circuit comprised of a nonpolar electrolytic capacitor 126, having a capacitance of 0.47 microfarads and a resistor 128 having a resistance of 470 kilohms is connected in parallel with resistor 120. Resistor 120, capacitors 124 and 126, and resistor 128 comprise a feedback circuit 129 between emitter 116 and pin 100.

As is well known to those skilled in the art, the feedback circuit 129 provides two ranges of amplification through the error amplifier 96. When the motor is operating at a speed close to its desired operated speed, the impedance through capacitor 126 is relatively high, causing the feedback loop to have about a 10 megohm impedance, as set by resistor 120. Capacitor 124 acts as an integrating capacitor to remove any remaining ripple from the error signal.

Since the instant invention is to be used in an appliance such as a food processor wherein the motor is started abruptly, the relatively high gain through the error amplifier, as set by the feedback loop through resistor 120, should be minimized on start-up to provide greater circuit stability. This is achieved through the parallel feedback loop of capacitor 126 and resistor 128. Since the motor, when started, in effect, provides a step function signal to error amplifier 96, the rapidly changing signal finds a relatively low resistance feedback pathway through capacitor 126 and resistor 128. The low impedance path substantially reduces the gain through error amplifier 96 to make the circuit more stable when the motor speed is abruptly changing.

The addition of too much capacitance at any single point in the error amplifier circuit has the effect of increasing the response time of the circuit or, in effect, making the circuit sluggish. In order to provide adequate filtering while maintaining the proper response time, a portion of the remaining AC component from the quasisinusoidal signal produced by magnetic pickup 60 is removed by capacitor 108 while additional filtering is performed by integrating capacitor 124.

In order to provide accurate timing of the point at which the triac 40 switches conducting to allow power to flow through the motor 32, a zero crossing detector 130 is provided. Since the amount of power that the motor receives is dependent upon the point in the alternating power cycle at which the triac 40 switches on for each half cycle of alternating line current, the zero crossing detector measures characteristics of the line alternating current so that the switching signal will be properly synchronized with the zero crossing point. AC power at 120 volts RMS is supplied to an input terminal 132 of the zero crossing detector 130. In order to allow solid state electronic components to perform the necessary timing and sensing functions, the AC power line signal is attenuated a factor of 1 in 12 through a resistor 134 connected to input terminal 132. Spiking, transients or other signals having a frequency other than the basic power line frequency are conducted to ground through a capacitor 136. Thus, a signal having a wave shape identical to and in phase with the power line signal but having a peak to peak voltage of about 15 volts is present at the junction of resistor 134 and capacitor 136.

A DC voltage must be added to the attenuated AC signal to shift the level of the AC signal sufficiently so that no portion of the level shifted signal is below 0 volts. This is achieved by connecting a resistance network 138 to the regulated power supply output terminal 23 to receive +22 volts therefrom. Resistance network 138 is comprised of a plurality of resistors, respectively numbered 140, 142, 144 and 146, connected between power supply output terminal 23 and ground. The resistance values have been selected so that the DC potential at the junction of resistors 140 and 142 is about 11.32 volts while the DC potential at the junction of resistors 142 and 144 is about 11 volts. The DC potential at the junction between resistors 144 and 146 is 10.68 volts. A resistor 148 and an electrolytic capacitor 150 are connected in series between the respective junction of resistors 142 and 144 and resistor 134 and capacitor 136. The junction of resistors 142, 144 and 148 is, in effect, an AC ground point. Thus, the attenuated AC signal and the 11 volt DC signal are added so that a level shifted AC signal varying between +3.5 and +18.5 volts in phase with the power line voltage is present at the junction of resistor 148 and capacitor 150. The level shifted voltage is supplied to a pair of comparators respectively numbered 152 and 154, at respective noninverting input terminals 156 and 158. In the present embodiment, the comparators 152 and 154 are National Semiconductor LM 339 amplifiers. Comparator 152 also receives at inverting terminal 160 the 10.68 voltage DC potential from the junction of resistors 144 and 146. Likewise, comparator 154 receives the 11.32 volt DC potential at inverting terminal 162 through a resistor 164. An electrolytic capacitor 166 is connected between the junction of resistors 140 and 142 and ground to conduct any power line frequency AC components from power supply 12 and input terminal 132 present on the voltage divider network 138 away from comparators 152 and 154.

In order to produce a timing signal for all portions during the alternating current cycle, it is necessary that, in effect, one of the comparators handle the negative portion of the AC voltage and the other handle the positive portion. An output terminal 170 of comparator 154 remains in grounded condition due to its open collector configuration until the level shifted AC voltage exceeds 11.32 volts. At this point, output terminal 170 switches to a blocking condition allowing a sync ramp generator 171 having a capacitor 172 to be charged through a resistor 174, which is connected to receive the positive 11.32 volt regulated potential from the junction of resistors 140 and 142.

The time constant of capacitor 172 and resistor 174 is chosen so that for the interval that output terminal 170 remains blocking, capacitor 172 charges in a linear fashion to provide a ramp voltage having a linear relationship to time. The ramp voltage has a minimum of 0 volts when capacitor 172 begins charging and a maximum of about 4 volts, which is reached at the same time that the level shifted AC potential drops below 11.32 volts. When the level shifted AC potential is between 10.68 volts and 11.32 volts, output terminal 170 of operational amplifier 154 is connected to ground, rapidly discharging capacitor 172. Once the level shifted voltage drops below 10.68 volts, an output terminal 180 of operational amplifier 152 is grounded causing noninverting terminal 162 of operational amplifier 154 to become grounded, again switching output terminal 170 blocking and allowing capacitor 172 to charge.

Thus, the output terminal 170 of the zero crossing detector 130 remains in a blocking state at nearly all times with the exception of a short period at zero crossing when the output terminal 170 is grounded. This allows the capacitor 172 and the resistor 174 to the sync ramp generator 171 to charge and discharge to produce a sawtooth wave potential at an output lead 182. The sawtooth wave has a frequency twice the line frequency of the power line voltage and is in synchronism therewith. It is clear that the sawtooth wave can be used to provide a highly linear and very precise timing reference signal.

In order to select the conduction angle of the triac, it is necessary to process both the sawtooth timing reference signal and the error signal. The error signal is supplied to an output comparator 199 consisting of a pair of LM 339 operational amplifier comparators, respectively numbered 200 and 202, at respective inverting input terminals 204 and 206. The sawtooth timing reference signal is supplied to comparators 200 and 202 at respective noninverting terminals 208 and 210. A pair of output terminals 212 and 214 of comparators 200 and 202 are connected to a resistor 216, which receives the previously mentioned positive 22 volt reference signal from output terminal 23 of the regulated power supply 12. Comparators 200 and 202 are identical to comparators 152 and 154, that is, as long as the potential at the inverting terminal is less than the potential at the noninverting terminal, the output terminal will remain in a blocking stage. This two-stage condition is used to control or steer a trigger signal to the triac 40. At the point during each half cycle at which the timing reference signal exceeds the error amplifier signal, comparator output terminals 212 and 214 switch to a blocking condition supplying a DC trigger signal to a diode 218 through a resistor 220 and to a gate 222 of triac 40. Triac 40 then switches conducting to supply electric current to the motor 32. A resistor 223 is connected to the junction of resistor 220 and gate 222 and to ground to prevent false triggering of triac 40.

The DC trigger signal is particularly desirable since motor current interruption caused by brush bounce will not cause the triac to switch to a nonconducting state, as would occur in prior art circuits which supply trigger pulses to the triac gates.

Since the error amplifier signal is proportional to the amount of power which the motor must draw to operate at a selected speed and since the amplitude of the timing signal is also substantially linear with respect to time, the combination of the two provides very precise timing of the switch point of the triac 40. A snubber network consisting of a capacitor 224 and a pair of parallel resistors 226 and 228 connected from a first main terminal 230 of the triac 40 to ground to protect the triac during the switching from inductive loads generated in the motor as a second main terminal 232 of the triac 40 is connected to ground for ground return.

The instant invention provides a highly accurate speed control for an electric motor for use with an appliance. The magnetic pick-up 60 supplies the quasisinusoidal signal proportional to the rotational speed of the motor 40 to a frequence to voltage converter. The frequency to voltage converter supplies a DC voltage proportional to the speed of the motor to a differential amplifier which compares a user selected reference signal with the DC speed signal to generate an error signal. A zero crossing detector and ramp generator 130 produces a sawtooth wave at twice power line frequency in synchronism with the AC line current which is compared to the error voltage to precisely control the switching point of the triac 40.

It may also be appreciated that the instant circuit can be quickly and easily calibrated before assembly with electric motor 32. Calibration is performed by supplying a positive regulated DC potential to connection point 23. A conventional signal generator producing a sine wave signal of variable frequency is connected to resistor 62.

While there has been shown and described a single embodiment of the present invention, it will be understood that changes and modifications may be made to the claims by those skilled in the art, and it is, therefore, intended in the appended claims to cover all such changes and modifications as fall within the true spirit and scope of the present invention.

What is claimed as new and desired to be secured by Letters Patent of the United States is:

1. A feedback motor speed control circuit comprising a tachometer producing a time-varying signal having a frequency proportional to a rotational speed of an electric motor, means for converting said time-varying signal to a speed signal having an amplitude proportional to said frequency of said time-varying signal, means for processing said speed signal to produce an error signal, means for producing a periodic timing signal synchronized with the alternating current power source having a zero voltage crossing detector with at least one comparator which resets the periodic timing signal portion to zero at each half cycle of said alternating current power source, means for producing a trigger signal when said error signal and said timing signal are in a preselected relation, and means for supplying electric power to said electric motor in response to said trigger signal.

2. The feedback motor speed control circuit defined in claim 1 wherein said comparator is adapted to be driven in either at conducting or a blocking state in synchronism with each zero crossing of the potential of the alternating current power source.

3. The feedback motor speed control circuit defined in claim 2 wherein a ramp generator is connected to be controlled by said comparator to produce a substantially linear sawtooth timing signal in synchronism with the alternating current power supply.

4. The feedback motor speed control circuit defined in claim 3 wherein said trigger signal produced by said error signal receiving means is a direct current signal.

5. A motor speed control circuit for selectively regulating the speed of an appliance motor to any selected level comprising a tachometer producing a time-varying signal having a frequency proportional to a rotational speed of an electric motor, means for converting said time-varying signal to a speed signal having an amplitude proportional to said frequency of said time-varying signal, means for producing a reference signal, the amplitude of which is proportional to a selected speed level, means for comparing said speed signal and said reference signal to produce an error signal, means for producing a periodic timing signal having a frequency corresponding to and synchronized with the frequency of the alternating current power source by receiving a potential from said alternating current power source and adding to it a direct current potential to provide signal amplitude shifting, means for receiving said error signal and said timing signal and producing a trigger signal synchronized with said timing signal and said zero crossing point of said alternating current power source, and means for providing electric power to said electric motor in response to said trigger signal.

6. The feedback motor speed control circuit defined in claim 5 wherein said means for producing said periodic timing signal includes a zero voltage crossing detector which resets the periodic timing signal potential to at each half cycle of said alternating current power source.

7. The feedback motor speed control circuit defined in claim 6 wherein said trigger signal produced by said error signal receiving means is a direct current signal.

8. A feedback motor speed control circuit comprising a tachometer for producing a pulsating speed signal, the frequency of which is a multiple of the actual rotational speed of an electric motor, speed selection means, which is adjustable to produce a stable voltage reference signal, the magnitude of which is proportional to a selected speed level, a differential amplifier for comparing said speed signal and said reference signal and producing an error signal the voltage of which is indicative of the difference between the actual speed and the selected speed level, a first and a second operational amplifier comparators for producing a periodic timing substantially linear sawtooth signal having a frequency twice the frequency of the alternating current power supply and being in synchronism with an alternating current power supply, a third comparator for receiving said error signal and said timing signal and producing a direct current trigger signal for the remainder of a half cycle of the alternating current power supply when said error signal is less than said timing signal, and a phase controlled thyrister for providing electric power to said electric motor in response to said trigger signal.

* * * * *